June 16, 1964 W. KLEIN 3,137,771

PAGING SYSTEM

Filed June 12, 1962 2 Sheets-Sheet 1

INVENTOR

W. KLEIN

BY Paul W. Hemminger

ATTORNEY

PAGING SYSTEM

Filed June 12, 1962

INVENTOR
W. KLEIN
BY Paul Henninger
ATTORNEY

United States Patent Office 3,137,771

Patented June 16, 1964

3,137,771

PAGING SYSTEM

Wolfgang Klein, Stuttgart-Weilimdorf, Germany, assignor to International Standard Electric Corporation, New York, N.Y., a corporation of Delaware Filed June 12, 1962, Ser. No. 201,930

Claims priority, application Germany June 28, 1961

7 Claims. (Cl. 179—18)

In telephone systems it is possible to page any subscriber by dialling the number of a paging equipment, and by subsequently dialling the code number of the respective subscriber. The paged person may then answer the call from any random subscriber's station by dialling a reporting code number, and will then be connected to the station of the paging person. If several paging orders arrive simultaneously at the paging equipment over different connecting circuits, these orders are executed one at a time and in sequence. In known types of systems the code numbers are stored in storage devices assigned to the individual connecting circuits and are thereafter repeatedly called up by the paging equipment until the paged person has answered the call. Since the paged person is not always in a position of reporting immediately, and since the paging processes may take some time before being completed, other subscribers desiring paging service may have to wait quite some time before being served.

It is the object of the present invention to provide a paging system in which the paging is restricted to a short period of time, but in which every call originating person can wait for the answer of the paged person.

Accordingly to the invention this is accomplished in that each connecting circuit has a storage device associated therewith in which the code number of the paged person is retained after the paging operation has been completed. There is also provided a number of reporting storage devices corresponding to the number of the connecting circuits, in which the code numbers of the paged answering person can be stored. Thereafter, the paging storage devices and the reporting storage devices are connected to a common evaluating equipment for identifying the respective paging and reporting storage devices which contain the same stored code numbers and for causing the connecting-through of the calling and paged parties.

According to a further embodiment of the invention the code number stored in a reporting storage device is compared with the code numbers stored in the paging storage devices, until that particular paging storage device has been found which contains the called code number.

According to a still further embodiment of the invention, each decade of the code number in both the paging and the reporting storage device has a storage means comprising one input and ten outputs. The corresponding outputs of all of the paging and reporting storage devices are connected in multiple while the inputs in each paging storage device are arranged in a chain of stepping relays, and the inputs in each reporting storage device are connected together or connected to one pole of a source of voltage.

Figure 1:
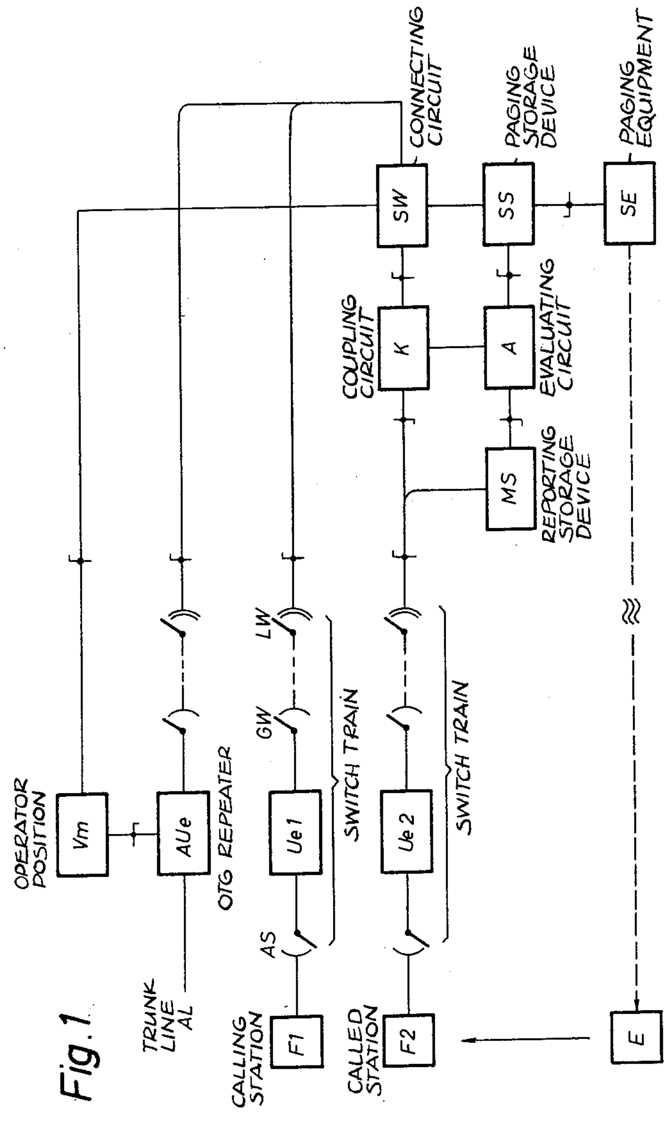
Figure 2:
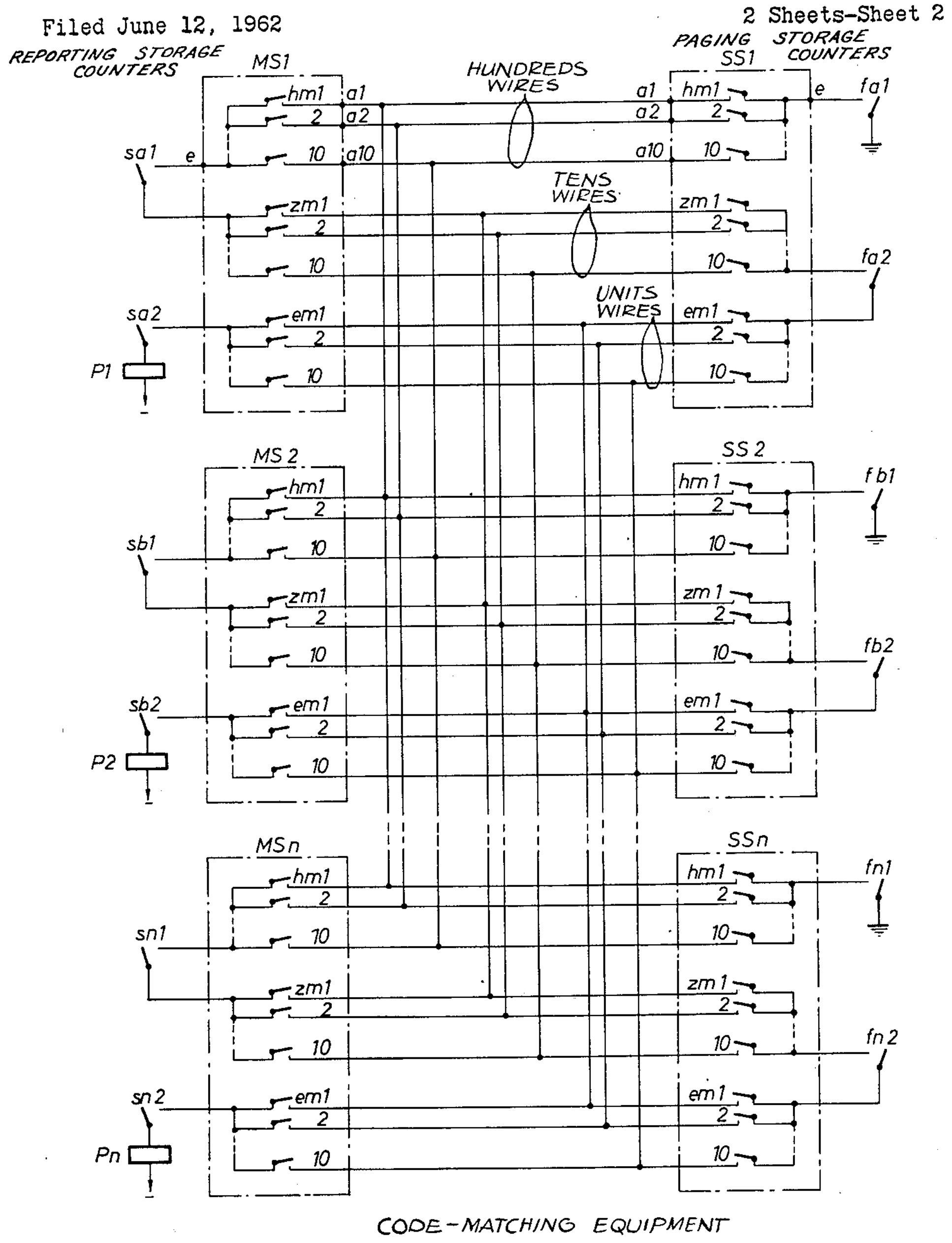

The nature of the invention will now be explained in detail with reference to FIGS. 1 and 2 of the accompanying drawings, in which:

FIG. 1 shows a block diagram of one embodiment relating to a paging system comprising several connecting circuits; and FIG. 2 shows one embodiment of an evaluating circuit common to all of the paging and reporting storage devices.

The subscriber at station F1 dials the paging code number and is connected to a connecting circuit SW which has a paging storage device SS associated therewith. This paging storage device SS receives the subsequently dialled code number of the wanted subscriber F2 and thereupon connects itself to the paging equipment SE, from where the code number is fed in a coded form to a receiver E. The calling time of the paging equipment SE is set to be very short. After the paging or calling time expires, the paging equipment SE is released, and the paging person at the calling station remains connected to the connecting circuit SW until the wanted person reports or answers the call.

The wanted person, whose attention has been directed to the paging call, may now use any random subscriber's station F2 for dialling his reporting code number. The answering person seizes one of the reporting inputs which has a reporting storage device MS assigned thereto. This reporting storage device receives and records the subscriber's own code number which the subscriber dials. Upon termination of the dialling, the paging storage device SS which contains the same code number as the code number stored in the reporting storage device MS is identified by an evaluating circuit A which is common to all of the paging and reporting storage devices. A coupling device K is set by the evaluating circuit A and effects the connecting-together of the calling and called parties. The two involved storage devices are then released while the speaking connection is maintained.

In this way, several simultaneously existing paging orders may be handled without causing any appreciable waiting time for the individual paging subscribers. Upon the completion of the transmission of the paging signals for paging the first wanted person, the paging signals may immediately be transmitted for the second paged person, and so on. It can be seen that it is immaterial whether the first wanted person or the second wanted person is the first one to report. If both of the wanted persons report simultaneously, a conventional type of blocking chain insures that only one reporting storage device will seize the evaluating circuit at any time.

It is also possible that a local exchange subscriber seizes the paging equipment over a trunk line AL and an outgoing office repeater AU*e* either with or without the assistance of the operator V*m*. On trunk calls, the noted shorter waiting time is of special importance in view of the possible reduction in charge fees.

The matching of the paging and the reporting storage devices which contain the same stored code numbers can be accomplished by comparing the code numbers stored in one reporting storage device successively with the code numbers stored in the paging storage devices. The step-by-step testing of the paging storage devices is accomplished by using a stepping chain which may consist of relays, magnetic counters, or electronic switching equipment.

One embodiment of a matching circuit is shown in FIG. 2. In this embodiment three ten-armature magnetic counters SS1 to SS*n* are used as the storage means for storing three-digit code numbers in each paging storage equipment, and counters MS1 to MS*n* are used in each reporting storage equipment. These counters comprise a hundreds counter comprising the contacts *hm*1 . . . *hm*10, a tens counter comprising the contacts *zm*1 . . . *zm*10, and a units counter comprising the contacts *em*1 . . . *em*10. It is possible to use selectors, relays, or other storage means comprising one input *e* and ten outputs *a*1 . . . *a*10 in lieu of the noted magnetic counters.

The corresponding outputs of all paging and reporting storage devices are connected in multiple. The input of the hundreds counter in the paging storage device SS1 is selectively connected to ground through contact *fa*1, whereas the inputs of the tens and units counters in this paging storage device are selectively connected to one another by contact *fa*2. The contacts *fa*1, *fa*2 are contacts of a relay, magnetic counters, or the like arranged to form a stepping chain. The contacts *fb*1, *fb*2 . . . *fn*1, *fn*2 are contacts of other relays included in the noted stepping chain and are operated one at a time sequentially.

The inputs of the hundreds and tens counters in the reporting storage device MS1 are connected to one another by a contact *sa*1, whereas the input of the units magnet of this reporting storage device is connected to the battery connected winding of a test relay P1 by the action of a contact *sa*2. The contacts *sa*1, *sa*2 form part of a starting switching means which is arranged in a conventional type of blocking chain. The contacts *sb*1, *sb*2 . . . *sn*1, *sn*2 of other starting switching means, are assigned to the individual reporting storage devices and are associated with the test, relays P2 . . . P*n*. The starting switching means (not shown) are arranged in a blocking chain and are adapted to effect the starting of the stepping chain.

The evaluating process is performed as follows: After a code number has been stored in any random one of the paging storage devices SS, and after this same code number has been stored in any random one of the reporting storage devices MS, the starting switching means (not shown) which is assigned to the respective seized reporting storage device is operated to start the stepping chain. The contacts *fa, fb,* etc. are now operated one at a time in turn, until a test circuit has been completed to the test relay associated with the respective seized reporting storage device. This test relay operates and, in a manner not shown prevents the stepping chain from advancing further. The position that the stepping chain stops identifies both the paging storage device and the reporting storage device containing the same stored code numbers. If, for example, both the paging storage device SS2 and the reporting storage device MS1 contain the code number 210 then, in the second test step of the stepping chain, the following test circuit will be extended through all decades of the involved storage devices:

Ground, *fb*1, *hm*2 (SS2), *hm*2 (MS2), *sa*1, *zm*1 (MS1), *zm*1 (SS2), *fb*2, *em*10 (SS2), *em*10 (MS1), *sa*2, P1, minus.

This is the only test circuit possible, because all of the remaining contacts *s* and *f* are opened at this time. The relays (S*a*, F*b*) which are operated in this particular circuit condition cause a setting signal to be transmitted to the coupling circuit (FIG. 1) for effecting the connecting-through of the calling and called parties.

While the principles of the invention have been described above in connection with specific apparatus and applications, it is to be understood that this description is made only by way of example and not as a limitation on the scope of the invention.

What is claimed is:

1. In a paging system for extending connections between calling and called subscribers each having individual code numbers assigned thereto, means controlled by any calling subscriber for generating signals indicative of the code number of any desired called subscriber, means responsive to the said generation of signals for recording said signals in one of a plurality of paging storage devices, and for signalling the called subscriber, means controlled by any answering called subscriber for generating signals indicative of the code number of the answering called party, means responsive to the last said generation of signals for recording the last said signals in one of a plurality of answering storage devices, matching means for determining the paging storage means and answering storage means containing the same recorded signals, and switch means responsive to said matching operation for extending a connection between the said calling and called subscribers.

2. A paging system as set forth in claim 1 wherein the said matching means compares the stored signals in the said answering storage device successively with the stored signals in each paging storage means.

3. A paging system as set forth in claim 1 wherein successive calls to desired subscribers are successively stored in individual ones of said plurality of paging storage means and wherein the said connections between calling and called subscribers are extended in the order of answering by said called subscribers.

4. A paging system as set forth in claim 1 wherein said matching means extends the said connections on a one-at-a-time basis.

5. A paging system as set forth in claim 3 wherein the said called subscribers are signalled in the order that the calls are recorded in said paging storage devices.

6. A paging system as set forth in claim 3 wherein successive signallings of different called subscribers are completed irrespective of answer by any of said called subscribers.

7. A paging system as set forth in claim 1 wherein each said paging storage means and said answering storage means includes a separate store for each digit of said code numbers and wherein said matching means includes a series connection through all of said stores in one paging storing means and in one answering storage means to extend the said connection.

No references cited.